United States Patent Office 3,544,539
Patented Dec. 1, 1970

3,544,539
PROCESS FOR THE SUSPENSION POLYMERIZATION OF VINYL CHLORIDE
Shunichi Koyanagi, Hajime Kitamura, and Shigenobu Tajima, Naoetsu-shi, Niigata-ken, Japan, assignors to Shin-Etsu Chemical Industry Co., Ltd., Tokyo, Japan
No Drawing. Filed Nov. 8, 1966, Ser. No. 592,759
Int. Cl. C08f 1/11, 3/30
U.S. Cl. 260—92.8                    5 Claims

ABSTRACT OF THE DISCLOSURE

In the suspension polymerization of vinyl chloride monomer to polyvinyl chloride in an aqueous dispersion system, under agitation, the agitation is interrupted before the polymerization rate has reached about 15%. The system, after interruption of the agitation is left in unagitated state for a period of 30 minutes to five hours and until the polymerization rate has risen to about 20 to 40% whereupon agitation is again resumed to complete the polymerization.

---

This invention generally relates to polymerization of vinyl chloride and is particularly directed to a novel and improved process for the production of polyvinyl chloride by suspension polymerization.

It has previously been suggested to suspension polymerize vinyl monomers in an aqueous dispersion medium in the presence of an oil-soluble catalyst or initiator. In the prior art suspension polymerization processes of the indicated kind, a protective colloid such as, for example, polyvinyl alcohol, methyl cellulose, gelatin or starch is used as the dispersing agent. These prior art processes, however, are not fully satisfactory because as a result of the polymerization, polymer scale tends to deposit in considerable amounts on the inner wall of the polymerization vessel. This not only decreases the polymer yield but also negatively affects the cooling of the polymerization equipment and, of course, involves considerable labor and time for descaling the vessel walls. The descaling interrupts the continuity of the procedure with a consequent drop of operation efficiency both in respect to the polymerization equipment and the procedure as a whole.

Various attempts have been made to overcome these and other disadvantages of the prior art procedures. However, these prior attempts have not provided a fully satisfactory solution.

It is, accordingly, a primary object of the present invention to overcome the disadvantages and drawbacks of the prior art procedures and to provide a process for the suspension polymerization of vinyl chloride which is exceedingly simple to carry out and which yields polyvinyl chloride of excellent quality and in high yield.

Generally, it is an object of this invention to improve on the art of suspension polymerization of vinyl chloride as presently practiced.

Briefly, and in accordance with this invention, the polymerization of a monomer-containing aqueous dispersion system, which has previously been homogenized, is initiated under effective agitation. The agitation is discontinued before the rate of polymerization has reached about 15%. The reaction system is then maintained without agitation for a period of about 30 minutes to five hours until the rate of polymerization has reached about 20 to 40%, whereupon agitation is resumed and the polymerization completed.

It has been observed and established that by proceeding in this manner, the deposition of polymer scale on the inner wall of the polymerization vessel is appreciably reduced while the polyvinyl chloride obtained according to the inventive procedure is of high quality and has a particle size distribution of favorable characteristics. The disadvantages of the prior art processes are thus overcome by intentionally interrupting the agitation and permitting the polymerization to continue in a non-agitated state for a predetermined period until a predetermined polymerization degree has been obtained.

The inventive suspension polymerization procedure is applicable not only to the polymerization of vinyl chloride proper but also to the suspension polymerization of mixtures consisting essentially of vinyl chloride and lesser amounts of vinyl monomers which are copolymerizable with vinyl chloride. Such vinyl monomers which are copolymerizable with vinyl chloride are, for example, vinyl ester, vinyl ether, acrylic acid and its ester, methacrylic acid and its ester, aromatic vinyl compounds, alkyl ester and anhydride of maleic acid and fumaric acid, vinylidene halide, vinyl halide excluding vinyl chloride, and α-monoolefin. The mixture should contain at least 50% of vinyl chloride monomer.

The initial preparatory agitation time for dispersing the monomer or monomeric mixture, prior to the initiation of the polymerization proper, may vary and is to a certain extent dependent on the kind and amount of suspension agent added to the particular polymerization system, the ratio of the monomer or monomeric mixture to the aqueous phase, the type of agitation employed and other factors. In any event, and as a general proposition, it is recommended that this preparatory agitation is carried out until the monomer or monomeric mixture is completely dispersed in the aqueous phase. It should be avoided that polymerization is initiated before the monomer or monomeric mixture has been fully dispersed within the aqueous phase since otherwise disappointing results may be obtained. Thus, for example, if suspension polymerization is carried out in accordance with the present invention with the polymerization being initiated before the monomeric vinyl chloride has been fully suspended, very coarse polyvinyl chloride particles may be obtained or polymer scale deposition on the inner wall of the polymerization vessel may increase.

As stated previously, the agitation is intentionally discontinued before the polymerization rate or degree has reached the 15% value and the reaction mixture is then left in undisturbed, unagitated state until the polymerization rate has risen to about 20 to 40%. In a similar manner as the preparatory agitation, the time during which the system is left in unagitated state depends on the kind and amount of suspension agent which is used in the system. In general, however, a time period of about between 30 minutes and not more than five hours has proved to give the best results. This is so for the following reasons: When the rate of polymerization has exceeded 15% and the system is thereafter left in unstirred condition for less than 30 minutes, the undesired polymer scale deposition will not be noticeably decreased as compared with that occurring in a suspension polymerization procedure wherein the system is agitated throughout the polymerizing procedure. On the other hand, if agitation is resumed after the polymerization rate has exceeded 40% and agitation is suspended for a period exceeding five hours, the resulting polyvinyl chloride will be in conglomerated form and is not obtained in the form of fine particles, but rather in the form of very coarse particles. Moreover, such system would have a tendency to deposit a mass of polymer in the upper portion of the polymerization vessel. Generally, undesired phenomena and results may be obtained if the indicated time periods and polymerization rates are not adhered to.

The duration of the unagitated state may be divided into two or more periods, provided the total period of unagitated state and the indicated polymerization rate are kept within the ranges specified.

The agitation is resumed after the rate of polymerization has risen to 20 to 40% and the polymerization is then thus completed in customary manner. It is essential that resumption of the agitation take place before the rate of polymerization has risen above 40% and that such resumption take place before the period of non-agitated state exceeds five hours. The resumption of the agitation is essential to prevent separation of the products from the dispersion medium and depositing of the products. The period during which the system is agitated once agitation has resumed may fluctuate and depends upon the kind and amount of suspension agent or catalysts added to the particular polymerization system and the ratio of the monomer or monomeric mixture to the aqueous phase.

The suspension agents and catalysts which may be used in the present invention may be of customary composition, to wit, they may correspond to those which have previously been employed in the prior art suspension polymerization procedures of vinyl chloride. Generally, customary suspension agents used for this purpose are synthetic high polymers such as polyvinyl alcohol, methyl cellulose, polyvinyl pyrrolidone, polyvinyl methyether, maeic anhydride and vinyl acetate copolymer, or such natural high polymers as starch, gelatin, tragecanth gum, and gum arabic. These compounds may be used singly or in combination or mixtures in an amount preferably from 0.01 to 10% calculated on the total amount of vinyl chloride monomer or monomeric mixture in the system.

In respect to catalysts, the following examples are given: organic peroxides, such as lauroyl peroxide, benzoyl peroxide, 2,4-dichlorobenzoyl peroxide, t-butyl peroxypivarate, or diisopropylperoxydicarbonate, or an azo compound such as $\alpha,\alpha'$-azobisiso-butylonitrile. Such catalysts are advantageously used in amounts from 0.001 to 0.5% calculated on the total amount of the vinyl chloride monomer or monomeric mixture in the system.

It has previously been suggested to effect suspension polymerization in some instances in the presence of a small amount of water insoluble solid powders or surface active agents to facilitate the suspension and/or to admix the system with a solvent such as alcohols, chlorohydrocarbons or aliphatic or aromatic hydrocarbons for the purpose of adjusting the molecular weight of the polyvinyl chloride. These additions are usually made to the reaction system prior to initiating the polymerization. It has been established that additions of such compounds in no way affect the beneficial effects and advantages obtained by the present invention.

The primary advantage of the present invention is that it prevents the deposition of polymer scale, without having to use any particular additives or equipment and without negatively affecting the characteristics such as the heat stability, workability, and chemical and other properties of the resulting polyvinyl chloride. Furthermore, the inventive procedure does not increase the manufacturing cost and does not require additional equipment.

The invention will now be described by several examples, it being understood, however, that these examples are given by way of illustration and not by way of limitation and that many changes may be effected without affecting in any way the scope and spirit of this invention as recited in the appended claims.

GELATION TEST

To 100 g. of polyvinyl chloride were added 0.5 g. of tribasic lead sulfate, 2.5 g. of lead stearate, 0.7 g. of barium stearate, 0.1 g. of titanium white, and 0.004 g. of carbon black. The mixture was rolled at 155° C. for 7 minutes into a one millimeter-thick sheet. The number of transparent particles contained in the sheet thus formed was counted as representing the gelation of the product. The gelation of the product was improved with a decrease in the number of particles.

HEAT STABILITY TEST

One and one half grams of dibutyl lead maleate and 0.5 g. of stearic acid were added to 100 g. of polyvinyl chloride. The mixture was rolled at 170° C. for 10 minutes and pressed at a pressure of 200 kg./cm.$^2$ g. at 170° C. for 10 minutes into a one millimeter-thick sheet. The sheet was heated in a Geer's oven at 180° C. The time required for the sheet to be scorched black after the start of heating was regarded as the heat stability value of the particular sample.

EXAMPLE 1

Into a polymerization vessel of stainless steel having a capacity of two liters and equipped with a paddle type agitator were introduced 300 parts by weight of a vinyl chloride monomer, 700 parts by weight of water in which were dissolved 0.9 part by weight of methyl cellulose having a viscosity of 100 cps. in a 2% aqueous solution at 20° C. and 1.5 parts by weight of lauroyl peroxide. The charge was agitated at 200 r.p.m. for 30 minutes, the temperature inside the vessel was increased to 56° C., and polymerization was initiated. The agitation was discontinued after one hour upon initiation of the reaction. Samples were kept in unagitated state for the different periods of time as shown in Table 1. The agitation was then resumed and the polymerization was concluded in 8 hours after the initiation. The properties of the polyvinyl chloride so obtained and the amounts of polymer scale deposited on the inner wall of the polymerization vessel were as given in Table 1. The polymerization rate at the point where the agitation was discontinued was found to be in the range between 5.4 and 6.2%.

TABLE 1

| | Experiment No. | | | | | |
|---|---|---|---|---|---|---|
| | 1 | 2 | 3 | 4 | 5 | 6 |
| Duration of unagitated state (hrs.) | 0 | 0.5 | 1 | 2 | 3 | 4 |
| Polymerization rate at the time when agitation was resumed (percent) | | 9.3 | 15.4 | 26.8 | 39.5 | 61.1 |
| Amount of polymer scale deposited (parts by weight) | 8.3 | 8.0 | 7.2 | 0.2 | 1.0 | 56.8 |
| Particle size distribution (rate of screen passage) (percent): | | | | | | |
| 60 mesh | 10.0 | 10.0 | 10.0 | 99.9 | 100 | 74.5 |
| 100 mesh | 88.3 | 91.0 | 86.5 | 93.5 | 90.0 | 63.9 |
| 200 mesh | 47.0 | 50.5 | 41.8 | 39.9 | 45.3 | 55.5 |
| Gelation (pc.) | 83 | 76 | 102 | 52 | 69 | 202 |
| Heat stability (min.) | 120 | 100 | 120 | 120 | 120 | 120 |

As can be seen from Table 1, resumption of agitation at polymerization rates of 26.8% (No. 4) and 39.5% (No. 5) resulted in considerable decrease in the amount of polymer scale deposition and yielded polyvinyl chloride with improved gelation. When the agitation was resumed at a polymerization rate of 61.1% (No. 6), the scale deposit increased and the product had poor gelation and took the form of very coarse particles. When the agitation was resumed at polymerization rates of 9.3% (No. 2) and 15.4% (No. 3), the scale deposition was the same as in the conventional method and the polymer thus obtained exhibited somewhat inferior gelation.

EXAMPLE 2

Polymerization was accomplished with the same material mixing ratio and under the same reaction conditions as in Example 1, except that the 0.9 part by weight of methyl cellulose used in the preceding example was replaced by 0.3 part by weight of polyvinyl alcohol having a saponification degree of 84.8% and mean polymerization degree of 2430. The results were as shown in Table 2.

It was thus found that the method of the invention is effectively applicable when the suspending agent is polyvinyl alcohol, and that in such case the particle size distribution and gelation of the product are improved.

TABLE 2

| | Experiment No. | | | |
|---|---|---|---|---|
| | 7 | 8 | 9 | 10 |
| Duration of unagitated state (hrs.) | 0 | 1.5 | 2.5 | 5 |
| Polymerization rate at the time when agitation was resumed (percent) | | 16.8 | 31.5 | 78.2 |
| Amount of polymer scale deposited (parts by weight) | 12.3 | 5.5 | 0.8 | (¹) |
| Particle size distribution (rate of screen passage) (percent): | | | | |
| 60 mesh | 90.5 | 91.3 | 89.9 | |
| 100 mesh | 46.6 | 50.3 | 43.1 | |
| 200 mesh | 2.5 | 2.7 | 1.9 | |
| Gelation (pc.) | 62 | 73 | 42 | |
| Heat stability (min.) | 120 | 120 | 120 | 100 |

¹ Polymer is almost conglomerated and deposited on the upper portion of the polymerization vessel.

EXAMPLE 3

The same procedure as described in Example 1 was followed, except that the amount of lauroyl peroxide was decreased to 0.15 part by weight and that the agitation was discontinued five hours after the initiation of the polymerization and when a polymerization rate of 7.9 to 8.5 percent was attained. The results were as shown in Table 3.

TABLE 3

| | Experiment No. | | | | |
|---|---|---|---|---|---|
| | 11 | 12 | 13 | 14 | 15 |
| Duration of unagitated state (hrs.) | 0 | 1 | 3 | 4 | 6 |
| Polymerization rate at the time when agitation was resumed (percent) | | 7.2 | 14.8 | 22.8 | 32.2 |
| Amount of polymer scale deposited (parts by weight) | 11.9 | 9.9 | 5.0 | 0.2 | 7.4 |
| Particle size distribution (rate of screen passage) (percent): | | | | | |
| 60 mesh | 99.9 | 100 | 100 | 100 | 53.3 |
| 100 mesh | 53.5 | 56 | 50.5 | 49.2 | 35.5 |
| 200 mesh | 2.9 | 3.0 | 2.3 | 1.0 | 10.3 |

As will be understood from the table, it was found that when the duration of the unagitated state was 6 hours, the polymer scale deposition was relatively significant and the particle size of the resulting polymer was coarse, even though the polymerization rate at the time of agitation resumption was relatively low at 32.2%.

EXAMPLE 4

The same procedure as described in Example 1 was followed except that 0.45 part by weight of diisopropyl-peroxydicarbonate was used as the catalyst and the agitation was discontinued one hour after the initiation of the polymerization and at a polymerization rate of 12.8 to 13.3%. The results were as shown in Table 4.

TABLE 4

| | Experiment No. | | |
|---|---|---|---|
| | 16 | 17 | 18 |
| Duration of unagitated state (hrs.) | 0 | 0.33 | 1 |
| Polymerization rate at the time when agitation was resumed (percent) | | 23.7 | 34.5 |
| Amount of polymer scale deposited (parts by weight) | 9.0 | 7.8 | 0.6 |
| Particle size distribution (rate of screen passage) (percent): | | | |
| 60 mesh | 100 | 100 | 100 |
| 100 mesh | 92.5 | 90.3 | 91.6 |
| 200 mesh | 52.2 | 53.0 | 46.8 |

In Experiment No. 17, the amount of polymer scale deposited was large even though the polymerization rate was 23.7 percent when the agitation was resumed. This indicated that the duration of unagitated state can be as important a factor as the polymerization rate at the time of agitation resumption.

EXAMPLE 5

Polymerization was carried out in the same manner as described in Example 1, except that the duration of the unagitated state was varied. The results obtained were as shown in Table 5. Throughout the experiments, the agitation was resumed invariable within three hours after the initiation of the reaction and when the polymerization rate attained was between 26.5 and 27.4 percent.

TABLE 5

| | Experiment No. | | | | |
|---|---|---|---|---|---|
| | 19 | 4 | 20 | 21 | 22 |
| Time of agitation discontinuance* (hrs.) | 0.5 | 1 | 1.5 | 2 | 2.5 |
| Polymerization rate at the time when agitation was discontinued (percent) | 2.2 | 5.7 | 8.2 | 11.5 | 16.8 |
| Amount of polymer scale deposited (parts by weight) | 0.9 | 0.2 | 0.2 | 2.0 | 8.5 |
| Particle size distribution (rate of screen passage) (percent): | | | | | |
| 60 mesh | 100 | 99.9 | 100 | 100 | 100 |
| 100 mesh | 89.9 | 93.5 | 91.3 | 91.5 | 90.9 |
| 200 mesh | 42.2 | 39.9 | 37.0 | 36.9 | 46.3 |
| Gelation (pc.) | 60 | 52 | 48 | 64 | 90 |
| Heat stability (min.) | 120 | 120 | 120 | 120 | 120 |

*Time elapsed after the initiation of polymerization.

As can be seen from the table, when the discontinuance of the agitation is delayed until the rate of polymerization exceeds 15 percent, the amount of polymer scale deposited is as much as that according to a conventional method and the effect achieved in this case is negligible.

EXAMPLE 6

Into a stainless steel polymerization vessel having a capacity of two liters and equipped with two stages of marine type agitators, were introduced 270 parts by weight of vinyl chloride monomer, 30 parts by weight of vinyl acetate monomer, 700 parts by weight of water in which 0.27 part by weight of polyvinyl alcohol and 0.03 part by weight of methyl cellulose were dissolved, and 0.3 part by weight of lauroyl peroxide. The charge was agitated at 120 r.p.m. for 45 minutes, thereby to disperse the monomeric mixture thoroughly in the aqueous phase. The charge was then heated to 63° C. and polymerization was initiated. After one and one-half hours after the initiation of polymerization, the agitation was discontinued, and the unagitated state was kept for 1.5 hours. Then, the agitation was resumed and the polymerization was concluded in 16 hours after the initiation of the reaction. The amount of polymer scale deposited on the inner wall of the polymerization vessel and the properties of the copolymer thus obtained were determined. The results were as shown in Table 6. Also, the results of a control experiment in which the same procedure as above was followed, except that agitation was carried out throughout the polymerization process, are given in the same table.

TABLE 6

| | Experiment No | |
|---|---|---|
| | 23 | 24 |
| Polymerization rate at the time when agitation was discontinued (percent) | (¹) | 8.8 |
| Polymerization rate at the time when agitation was resumed (percent) | (¹) | 20.0 |
| Amount of polymer scale deposited (parts by weight) | 11.1 | 0.7 |
| Particle size distribution (rate of screen passage) (percent): | | |
| 60 mesh | 98.0 | 99.9 |
| 100 mesh | 58.6 | 55.8 |
| 200 mesh | 10.8 | 3.4 |
| Gelation (pc.) | 54 | 22 |
| Heat stability (min.) | 80 | 80 |

¹ Agitation not discontinued.

These experiments demonstrate that the method of the invention is effective in the manufacture of vinyl chloride copolymers as well.

What is claimed is:

1. In a process of producing polyvinyl chloride, wherein vinyl chloride monomer is suspension polymerized in an aqueous dispersion system under agitation, the improvement which comprises that the agitation is interrupted before the polymerization rate has reached about 15 percent, whereafter the system is left in unagitated state for a period of about between 30 minutes to not more than 5 hours and until the polymerization rate has risen to about between 20 to 40 percent, whereupon agitation is resumed to complete the polymerization.

2. The improvement of claim 1, wherein the aqueous system contains a suspension agent and a polymerization catalyst.

3. The improvement of claim 2, wherein the vinyl chloride is in mixture with monomers copolymerizable with vinyl chloride, said monomers being selected from the group consisting of vinyl ester, vinyl ether, acrylic acid and its esters, methacrylic acid and its esters, aromatic vinyl compounds, maleic acid and its alkyl ester, maleic acid anhydride, fumaric acid and its alkyl esters, fumaric acid anhydride, vinylidene halide, vinyl halides other than vinyl chloride, and α-monoolefin, said mixture containing at least 50 percent of vinyl chloride monomer.

4. A process for the suspension polymerization of vinyl chloride which comprises the steps of:
  (1) initiating the polymerization by agitating an aqueous dispersion medium comprising vinyl chloride monomer, a suspension agent, a polymerization catalyst and water, said system having previously been homogenized by agitation, and discontinuing the agition before the rate of polymerization has reached 15 percent;
  (2) maintaining the system in a non-stirred state for a period of 30 minutes to 5 hours until the rate of polymerization has risen to 20 to 40 percent; and
  (3) resuming the agitation and completing the polymerization.

5. A method for the suspension copolymerization of vinyl chloride and monomers copolymerizable therewith which comprises the steps of:
  (1) initiating the polymerization under agitation of a system essentially consisting of an aqueous dispersion medium composed of a vinyl chloride monomer, a suspension agent, a polymerization catalyst and water, said system having previously been homogenized under agitation, said monomer being a mixture of vinyl chloride monomer and a monomer copolymerizable therewith and selected from the group consisting of vinyl ester, vinyl ether, acrylic acid and its esters, methacrylic acid and its esters, aromatic vinyl compounds, maleic acid and its alkyl ester, maleic acid anhydride, fumaric acid and its alkyl esters, fumaric acid anhydride, vinylidene halide, vinyl halides other than vinyl chloride, and α-monoolefin, said mixture containing at least 50 percent by weight of vinyl chloride monomer, and discontinuing the agitation before the rate of polymerization has reached 15 percent;
  (2) keeping the reactants in a non-stirred state for a period of 30 minutes to 5 hours until the rate of polymerization has risen to 20 to 40 percent; and
  (3) resuming the agitation and completing the polymerization.

References Cited

UNITED STATES PATENTS 3,004,013  10/1961  Kircher et al. ____ 260—92.8W
2,719,143   9/1955  Van Dijk et al. ____ 260—92.8W JOSEPH L. SCHOFER, Primary Examiner J. A. DONAHUE, JR., Assistant Examiner U.S. Cl. X.R.

260—85.7, 87.1, 87.5, 87.7, 78.5